United States Patent Office 3,013,045
Patented Dec. 12, 1961

3,013,045
METHOD OF PRODUCING ESTERS OF
ISOCYANIC ACID
Frank J. Sowa, Cranford, N.J.
(305 E. 46th St., New York, N.Y.)
No Drawing. Filed May 8, 1958, Ser. No. 733,805
12 Claims. (Cl. 260—453)

This application is a continuation-in-part of copending application Serial No. 547,840, filed November 18, 1955 now issued as Patent No. 2,834,799. The invention relates to novel methods for producing alkyl and aryl isocyanates.

As disclosed in the above identified application, boron trifluoride may be reacted with a mixture of alcohol and urea to produce alkyl carbamates or carbonates, or both. The reaction which takes place may be considered to involve an intermediate reaction in which the unstable compound, isocyanic acid, is formed as represented by the following equation

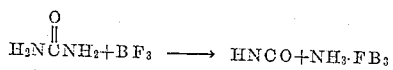

$$H_2NCNH_2 + BF_3 \longrightarrow HNCO + NH_3 \cdot BF_3$$

The isocyanic acid which is theoretically produced may then be said to react with the alcohol of the solution to produce the desired carbamate ester.

However, if a mono-substituted urea is employed in such a reaction, the process may be controlled so as to produce and isolate stable alkyl or aryl isocyanates according to the equation

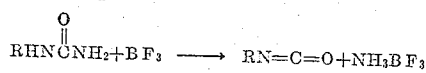

$$RHNCNH_2 + BF_3 \longrightarrow RN = C = O + NH_3BF_3$$

The reaction proceeds readily under the influence of substantially any source of boron trifluoride such as monoammino boron trifluoride ($NH_3 \cdot BF_3$), ammonium fluoborate ($NH_4 \cdot BF_4$), or various boron trifluoride complexes such as ether boron trifluoride ($R_2O \cdot BF_3$). A typical reaction of this type is represented by the following equation

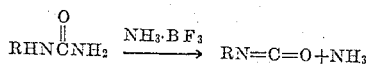

$$RHNCNH_2 \xrightarrow{NH_3 \cdot BF_3} RN = C = O + NH_3$$

If preferred, the complexes of monosubstituted urea and $BF_3$ may be employed and caused to decompose to produce the corresponding isocyanates as indicated by the equation

$$RHNCNH_2 \cdot BF_3 \longrightarrow RNCO + NH_3 \cdot BF_3$$

The reaction is thus very general in its application and may be used to produce a wide range of alkyl and aryl isocyanates.

Accordingly, the principal object of the present invention is to provide novel methods for producing esters of isocyanic acid.

A specific object of the invention is to provide methods whereby alkyl and aryl isocyanates may be produced from monosubstituted ureas under the influence of a source of boron trifluoride.

These and other objects and features of the present invention will appear from the following description thereof wherein typical examples are cited for the purpose of indicating suitable methods, and the procedures at present preferred, in carrying out the process without intending to limit the scope of the invention thereby.

In carrying out the processes of the present invention, it is often convenient to employ a solvent for the substituted urea or some other liquid medium in order to assure intimate contact of the urea with the source of boron trifluoride. However, the solvent or liquid used should be one which is substantially inert under the conditions of reaction so that it will not react with the isocyanate or isocyanic acid formed as the process is carried out. The reactants may be dissolved in solvents such as alcohols or suspended in liquids such as benzene or high boiling solvents such as solvent naphtha, xylene and the like. In order to assure ready separation of the isocyanate produced from the liquid medium employed, the boiling point of the liquid preferably differs sufficiently from that of the isocyanate to permit separation by distillation.

The reaction is effected by heating the substituted urea in the presence of the source of boron trifluoride. However, if the liquid employed is an alcohol or other liquid capable of reacting with the isocyanate produced to form a carbamate, carbonate or other reaction product, the temperature should be limited to preclude such reactions or to limit side reactions to a minimum. The temperature also should be limited so as to reduce or prevent the formation of isocyanate polymers, such as the dimers represented by the formula

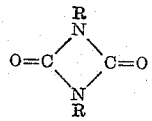

However, the formation of such polymers generally can be reduced by carrying out the reaction in the presence of nitrogen or other inert atmosphere.

The temperature employed in carrying out the reaction will thus be influenced by the liquid medium employed and the reactivity of the isocyanate ester being produced. Ordinarily, if the reaction mixture contains an alcohol or other liquid which tends to react with the isocyanate, the reaction temperature should be kept below about 80° C. until the alcohol has been removed and, in any event, such reactive liquid should be removed before the isocyanate is formed. In this way it is possible to reduce or prevent the formation of carbamates as described in application Serial No. 547,840. However, if the liquid medium is inert and has a higher boiling point, or if no liquid medium is used, the reaction may be carried out at higher temperatures up to 150 to 200° C., the upper temperature being limited only by the tendency of the isocyanate produced to undergo polymerization. For most purposes, it is preferred to carry out the reaction in a liquid medium inert to the isocyanate under the conditions of reaction and at temperatures above 50° C., whereas if no liquid medium is used, the reaction may be carried out at temperatures above the melting point of the urea.

The amount of the boron trifluoride or other source of boron trifluoride used may be relatively limited and is ordinarily no more than one mol. In fact, when gaseous boron trifluoride is employed and monoammino boron trifluoride produced in carrying out the reaction, no more than about 0.10 mol of $BF_3$ is required. The $NH_3 \cdot BF_3$ produced then serves as the activating agent to maintain the operation as the gaseous boron trifluoride is combined with ammonia.

In order to indicate typical procedures which may be employed in the practice of the present invention, the following examples are cited.

*Example I*

116 grams (1 mol) of isobutyl urea were dissolved in 500 cc. of methyl alcohol. The temperature of the mixture was maintained below 40° C. and 67 grams (1 mol) of gaseous boron trifluoride were bubbled into the solution. The isobutyl urea ·BF$_3$ addition compound was produced quantitatively. The pressure was then reduced to 100 mm. of mercury and all of the alcohol is distilled off. The temperature was then raised gradually to 75° C. while maintining a reduced pressure. Isobutyl isocyanate was distilled over giving a yield of about 80 grams of the product which boiled at 101° C. under atmospheric pressure. Some of the polymer of the isocyanate also was apparently produced.

*Example II*

116 grams (1 mol) of isobutyl urea were dissolved in 500 cc. of isopropyl alcohol, 42 grams (0.5 mol) of NH$_3$·BF$_3$ were added to the solution and the pressure reduced to 100 mm. The temperature was raised slowly to about 75° C. whereby the alcohol was first distilled off. Ammonia was then evolved and 70 grams of isobutyl isocyanate was collected.

*Example III*

The process of Example II was repeated but 26 grams (0.25 mol) of NH$_4$·BF$_4$ was used instead of the NH$_3$·BF$_3$. The yield was substantially the same as in Example II.

*Example IV*

136 grams (1 mol) of phenyl urea were dissolved in 500 cc. of isopropyl alcohol. 8.5 grams (0.125 mol) of gaseous boron trifluoride were bubbled into the solution while maintaining the temperature below 50° C. The pressure was then reduced to distill off the alcohol while keeping the temperature below 60° C. The pressure was further reduced to 10 mm. and the temperature slowly raised until ammonia was evolved and phenyl isocyanate distilled over. The reaction was continued until no further ammonia or phenyl isocyanate came off whereby a yield of 102 grams of the phenyl isocyanate boiling at 165° C. under atmospheric pressure was obtained.

*Example V*

136 grams (1 mol) of phenyl urea were dissolved in 500 cc. of isopropanol and 21 grams (0.25 mol) of NH$_3$·BF$_3$ were added. The temperature was raised to about 80° C. and the pressure was reduced to about 10 mm. while nitrogen was passed into the reaction flask. The alcohol was first collected and the reaction continued as long as ammonia was evolved. 95 grams of phenyl isocyanate was thereby obtained.

*Example VI*

The process of Example V was repeated using 26 grams (0.25 mol) of NH$_4$·BF$_4$ instead of the monoammino boron trifluoride of the preceeding example. The yield of phenyl isocyanate was the same.

The pressure and temperature under which the reaction is carried out may be raised or lowered as desired but reduction in temperature and pressure serves to reduce polymerization. The methods described above can also be carried out to advantage by introducing nitrogen or other inert gas into the flask or reaction chamber whereby the tendency for the isocyanate esters to polymerize is reduced.

The present invention is adapted for use in producing a wide range of other isocyanates such as ethyl, butyl, phenyl and naphthyl isocyanates. Diisocyanates can also be produced such as ethylene diisocyanate, tolyl diisocyanate, and such compounds as diphenylmethane 4,4′ diisocyanate; 3,3′ bitolyl 4,4′ diisocyanate and the like. Such higher boiling compounds can be isolated from the reaction mixture by recrystallization or other methods of purification.

It will thus be apparent that the particular conditions of reaction employed in any operation will depend largely upon the reactants used and the end products desired. In view thereof, it should be understood that the specific examples cited above have been chosen as representative of typical and preferred procedures and are not intended to limit the scope of the invention.

I claim:

1. The method of producing unsubstituted alkyl and aryl isocyanates which comprises the steps of heating a urea having the formula RHNCONH$_2$ where R is selected from the group consisting of alkyl and aryl hydrocarbon radicals with a source of boron trifluoride selected from the group consisting of gaseous boron trifluoride and agents which liberate boron trifluoride under the conditions of the reaction to a temperature below that at which substantial polymerization of the isocyanate reaction product will occur, and thereafter separating the resulting isocyanate compound from the reaction mixture.

2. The method as defined in claim 1 wherein the mixture is heated to a temperature above the melting point of the urea but below about 200° C.

3. The method as defined in claim 1 wherein the reaction is carried out while maintaining an inert atmosphere in contact with the reaction mixture.

4. The method as defined in claim 1 wherein the reaction is carried out in the presence of a solvent which is substantially inert under the conditions of the reaction.

5. The method as defined in claim 4 wherein the temperature of the reaction is maintained between about 50° C. and 200° C.

6. The method as defined in claim 4 wherein the solvent employed is a saturated monohydric alcohol and is distilled off prior to the separation of the isocyanate produced.

7. The method of producing unsubstituted alkyl and aryl isocyanates which comprises the step of heating a complex having the formula RNHCONH$_2$·BF$_3$ where R is selected from the group consisting of unsubstituted alkyl and aryl radicals, to a temperature above about 50° C. and below about 200° C. and until the compound RNHCO distills off from the complex.

8. The method of producing unsubstituted alkyl and aryl isocyanates which comprises the step of mixing a urea having the formula RHNCO·NH$_2$, where R is selected from the group consisting of unsubstituted alkyl and aryl radicals, with a liquid which is substantially inert under the conditions of the reaction, passing gaseous boron trifluoride into the solution while heating the solution to a temperature below that at which substantial polymerization of the isocyanate reaction product will occur, and thereafter separating the resulting isocyanate compound produced from the reaction mixture.

9. The method of producing an unsubstituted alkyl isocyanate which comprises the steps of dissolving a urea having a single unsubstituted alkyl substituent in an alcohol, bringing boron trifluoride into reaction contact with the solution while maintaining the temperature of the reaction mixture below about 80° C., then distilling off the alcohol under reduced pressure, and thereafter separating the isocyanate ester produced from the mixture.

10. The method of producing an unsubstituted aryl isocyanate which comprises the steps of dissolving a urea having a single unsubstituted aryl substituent in an alcohol, bringing boron trifluoride into reaction contact with the solution while maintaining the temperature of the reaction mixture below about 80° C., then distilling off the alcohol under reduced pressure, and thereafter separating the isocyanate ester produced from the reaction mixture.

11. The method of producing unsubstituted alkyl and aryl isocyanates which comprises dissolving a urea having the formula $RHNCO \cdot NH_2$ in which R is selected from the group consisting of unsubstituted alkyl and aryl radicals, in a solvent for the urea which is substantially inert under the conditions of reaction and has a boiling point below that at which substantial polymerization of the isocyanate reaction product will occur, bringing boron trifluoride into reaction contact with the solution, reducing the pressure and increasing the temperature of the solution until the solvent is distilled off and separately collecting the ester of isocyanic acid produced.

12. The method of producing phenylisocyanate which comprises heating mono phenyl urea with boron trifluoride in a liquid medium which is substantially inert under the conditions of the reaction while maintaining the reaciton mixture under reduced pressure and at a temperature not substantially exceeding 100° C., and thereafter separating the phenylisocyanate produced from the reaction mixture.

References Cited in the file of this patent

UNITED STATES PATENTS

| 2,773,086 | Slocombe et al. | Dec. 4, 1956 |
| 2,834,799 | Sowa | May 13, 1958 |

OTHER REFERENCES

Saunders et al.: "The Chemistry of the Organic Isocyanates," Chem. Revs., 43, pages 203 and 207 (1948).

Kastner: "Newer Methods of Preparative Organic Chemistry," 1948, Interscience Publishers, Inc., N.Y., page 253.